L. P. HARRIS.
Evaporating Pan.
No. 39,810.  Patented Sept. 8, 1863.
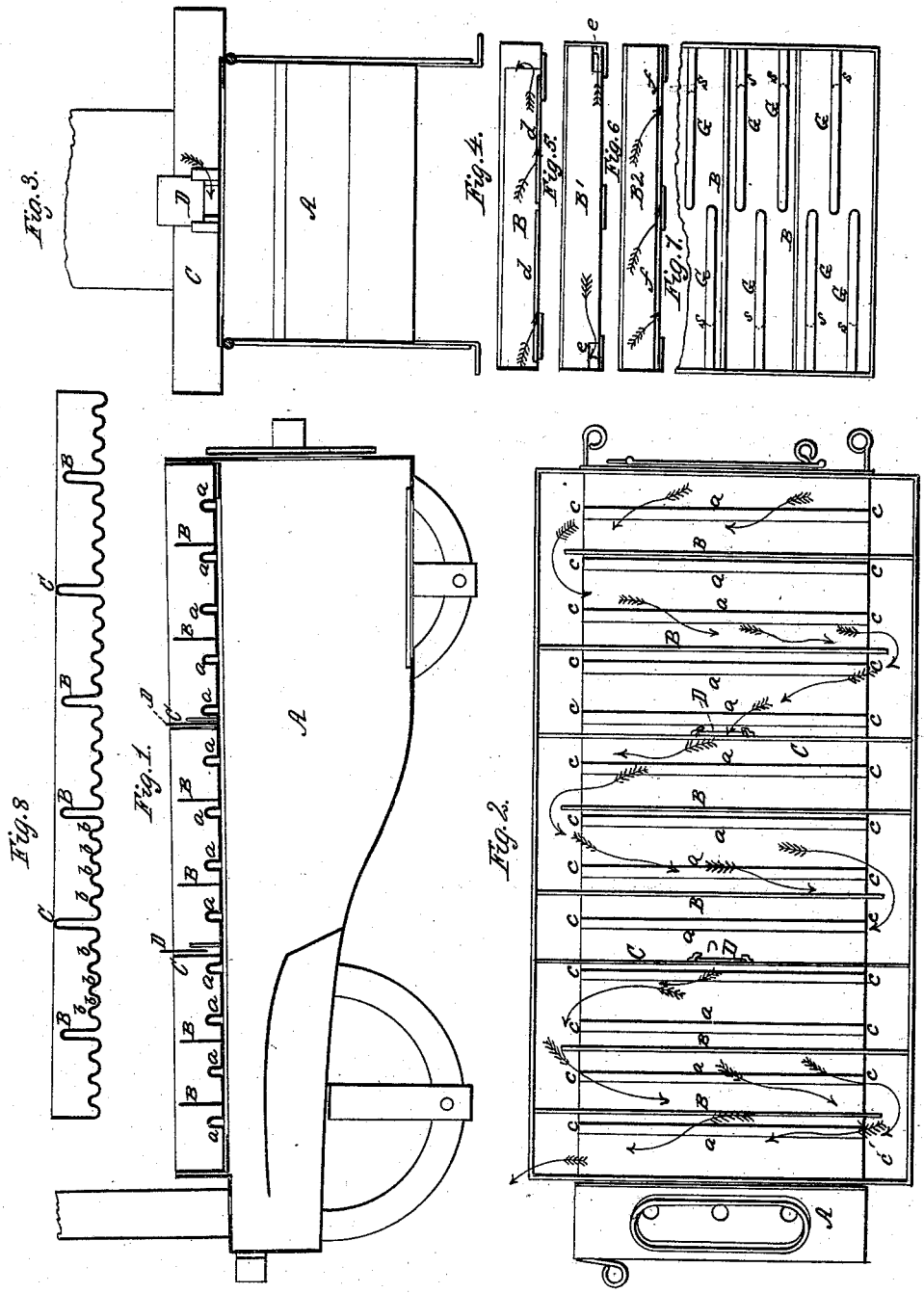
Witnesses:
R. T. Campbell
Edw
Inventor:
Lyman P. Harris
by his Attorneys
Mason Fenwick & Lawrence

UNITED STATES PATENT OFFICE.

LYMAN P. HARRIS, OF MANSFIELD, OHIO.

IMPROVEMENT IN SIRUP-EVAPORATORS.

Specification forming part of Letters Patent No. 39,810, dated September 8, 1863.

*To all whom it may concern:*

Be it known that I, LYMAN P. HARRIS, of Mansfield, in the county of Richland and State of Ohio, have invented a new and useful Improvement in Sirup and Sugar Evaporating Pans; and I do hereby declare that the following is a full, clear, and exact description of the same, reference being had to the accompanying drawings, forming part of this specification, in which—

Figure 1 is a longitudinal section of an evaporating apparatus with my improvement applied to it in its construction. Fig. 2 is a plan or top view of the apparatus with my improvement. Fig. 3 is a transverse section of the same. Figs. 4, 5, and 6 show cross-sections of some of the different kinds of partitioned pans to which my invention is to be applied. Fig. 7 is a top view of a partitioned pan, showing a different style of corrugated bottom. Fig. 8 is a sectional view illustrating more fully the character of my invention.

Similar letters of reference in the several figures indicate corresponding parts.

The invention which is here represented is not only intended to be applied to all partitioned evaporators wherein the sugar or sirup juices continuously or periodically flow from one divisioned section or channel into another similar section or channel, but all forms of common open pans. In some cases the partitions will be arranged to form a long zigzag partitioned course or circulation-passage from one end of the pan to the other. In other cases the flow will be in a sheet beneath the partitions and in a direct course over the whole bottom of the pan. In other cases each end of each partition will be provided with a right-angle flow-passage, such passages being from the bottom of the pan upward a proper distance. In other cases one or more partitions with gates will be employed, or all the partitions may have gates; and, finally, the surface-flow and the zigzag course or way may be combined in the one series of partitions. Therefore my invention does not consist under this patent in the manner of flowing the juice through the pan; but it consists in the combination of low corrugations or partitions over which the juices circulate, and the partitions which arrest the surface-scum of the juice and compel the clear juice to flow in an indirect course toward the sides of the pan, or in a thin wide sheet below the surface of the scum, or in narrow under-currents beneath themselves, or under gates, or through strainers, or in longitudinal side streams, all as will be hereinafter described.

It further consists in the combination of corrugated boiling-surface and plain scum surface or surfaces in the one bottom of a pan.

My invention is not only to secure great heating-surface in a small compass, but it is to secure all the advantages of the channeled or partitioned sugar and sirup evaporating pans in connection therewith, and also the advantages of a cooling-surface in connection with large heating or boiling surface, whether partitions are used or not.

To enable others skilled in the art to make and use my invention, I will proceed to describe the same with reference to the drawings.

The furnace A may be of brick or metal, as occasion may demand, and it may be of any desired construction.

In Figs. 1, 2, and 3 a pan with zigzag channel for the juice to flow through is shown. The bottom of this pan is corrugated, as at *a a*, or it may be as at *b b* in Fig. 8. The under side of these corrugations is open or exposed to the fire or flame from the furnace. The corrugations terminate crosswise of the pan, some distance from the sides, as indicated at *c c*. This is important so as to give a cooling-surface outside of the margin of the furnace on both sides, also to allow of a free circulation of juice over the pan. By having the pan heated the hottest about its middle portion the ebullition will cause the scum to flow from the center of the pan and to deposit upon the cooling-surface at the sides. These plain portions afford greater convenience for using a ladle or skimmer at such times as may be necessary. The partitions B, which arrest the scum and insure a circulation in an indirect course, are placed between the corrugations upon the bottom of the pan, and attached by one of their ends to the sides of the pan in the order represented. The high ledges or partitions C C extend entirely across the pan, and have a gate, D, at their center, this gate fitting in front of a passage cut in the under edge of each high ledge. There may be a surface-flow passage, *d*, in each of the partitions B, as shown in Fig. 4. The high ledges C C may be formed with the corrugations and the partitions B by crimping the metal, as shown in Fig. 8.

Instead of having partitions which do not attach to both sides of the pan, the ledges may be made as shown at B', Fig. 5, or B², Fig. 6, and the flow-passages formed as indicated at $e\ e$, Fig. 5, or $f\ f$, Fig. 6.

The corrugations G' G', Fig. 7, form a zigzag channel themselves, while the partitions B B are notched at their ends, after the manner shown in Fig. 5 at $e\ e$. This plan, Fig. 7, will be applied for under a separate patent hereafter by me.

My invention is a very important and useful one in the connection shown, as it economizes room, insures rapid evaporation, and enables me to effect a perfect arrest of scum and feculencies.

The dots $s\ s$, Fig. 7, show how the plain cooling-surface may be formed on the bottom corrugated, as in Fig. 7, by terminating the corrugations at $s\ s$.

I do not limit myself to the use of scum-arresters B, nor to high ledges C with gates D, as it is a new invention to corrugate one portion of the bottom of evaporating-pans, and in connection therewith have the scum-receiving portion plain or uncorrugated.

One of the leading objects of the plain surface around the sides of the pan outside of the corrugations, and also of the style of corrugations in Fig. 7, is to allow of a free circulation of the juice over the pan, so that the pan may be readily emptied of its contents without changing the position of the pan.

Having described my invention and stated its advantages, what I claim, and desire to secure by Letters Patent, is—

1. The construction of sirup and sugar evaporators, substantially as and for the purposes described.

2. The combination of a corrugated and a plain surface in the one pan-bottom, substantially as described.

L. P. HARRIS.

Witnesses:
JOHN HERSHEY,
JOHN MERIDETH.